United States Patent
Ku et al.

(10) Patent No.: US 8,566,860 B2
(45) Date of Patent: *Oct. 22, 2013

(54) SYSTEM AND METHODS FOR ADVANCED PARENTAL CONTROL

(75) Inventors: Bernard Ku, Austin, TX (US);
Armstrong Soo, San Ramon, CA (US);
Zhi Li, Martinez, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1108 days.

This patent is subject to a terminal disclaimer.

(21) Appl. No.: 11/940,840

(22) Filed: Nov. 15, 2007

(65) Prior Publication Data
US 2009/0133089 A1    May 21, 2009

(51) Int. Cl.
*H04N 7/16* (2011.01)
*H04N 21/454* (2011.01)

(52) U.S. Cl.
CPC ................... *H04N 21/4542* (2013.01)
USPC .......................................................... 725/28

(58) Field of Classification Search
USPC .......................................................... 725/28
See application file for complete search history.

(56) References Cited

U.S. PATENT DOCUMENTS

| | | |
|---|---|---|
| 5,382,983 A | 1/1995 | Kwoh et al. |
| 6,072,520 A | 6/2000 | Yuen et al. |
| 6,094,194 A | 7/2000 | Jackson |
| 6,212,679 B1 | 4/2001 | Vornsand |
| 6,321,381 B1 | 11/2001 | Yuen et al. |
| 6,396,531 B1 | 5/2002 | Gerszberg et al. |
| 6,445,398 B1 | 9/2002 | Gerba et al. |
| 6,504,529 B1 | 1/2003 | Inagaki et al. |
| 6,701,523 B1 | 3/2004 | Hancock et al. |
| 6,721,706 B1 | 4/2004 | Strubbe et al. |
| 6,728,679 B1 | 4/2004 | Strubbe et al. ............... 725/112 |
| 2005/0204398 A1* | 9/2005 | Ryal ............................. 725/112 |
| 2006/0130119 A1* | 6/2006 | Candelore et al. ............ 725/135 |
| 2006/0153296 A1* | 7/2006 | Deng ........................ 375/240.12 |
| 2009/0083781 A1* | 3/2009 | Yang et al. ...................... 725/20 |
| 2009/0092375 A1* | 4/2009 | Berry et al. ...................... 386/95 |

* cited by examiner

*Primary Examiner* — Bennett Ingvoldstad
(74) *Attorney, Agent, or Firm* — Guntin & Gust, PLC; Jay H. Anderson

(57) ABSTRACT

A set top box includes a processor. The processor is configured to receive a digital video stream and identify an I-Frame within the digital video stream. The processor is further configured to receive rating information for the I-Frame and to block playback a portion of the digital video stream in response to the rating information.

23 Claims, 8 Drawing Sheets

SYSTEM AND METHODS FOR ADVANCED PARENTAL CONTROL

FIELD OF THE DISCLOSURE

The present disclosure generally relates to communications networks, and more particularly relates to systems and methods for parental control of communications.

BACKGROUND

Content rating systems, such as for movies and television programming, are widespread. These content rating systems are intended to provide parents with information to better determine what programming is appropriate for their children. Parental control systems allow similar control over content viewed in the home.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
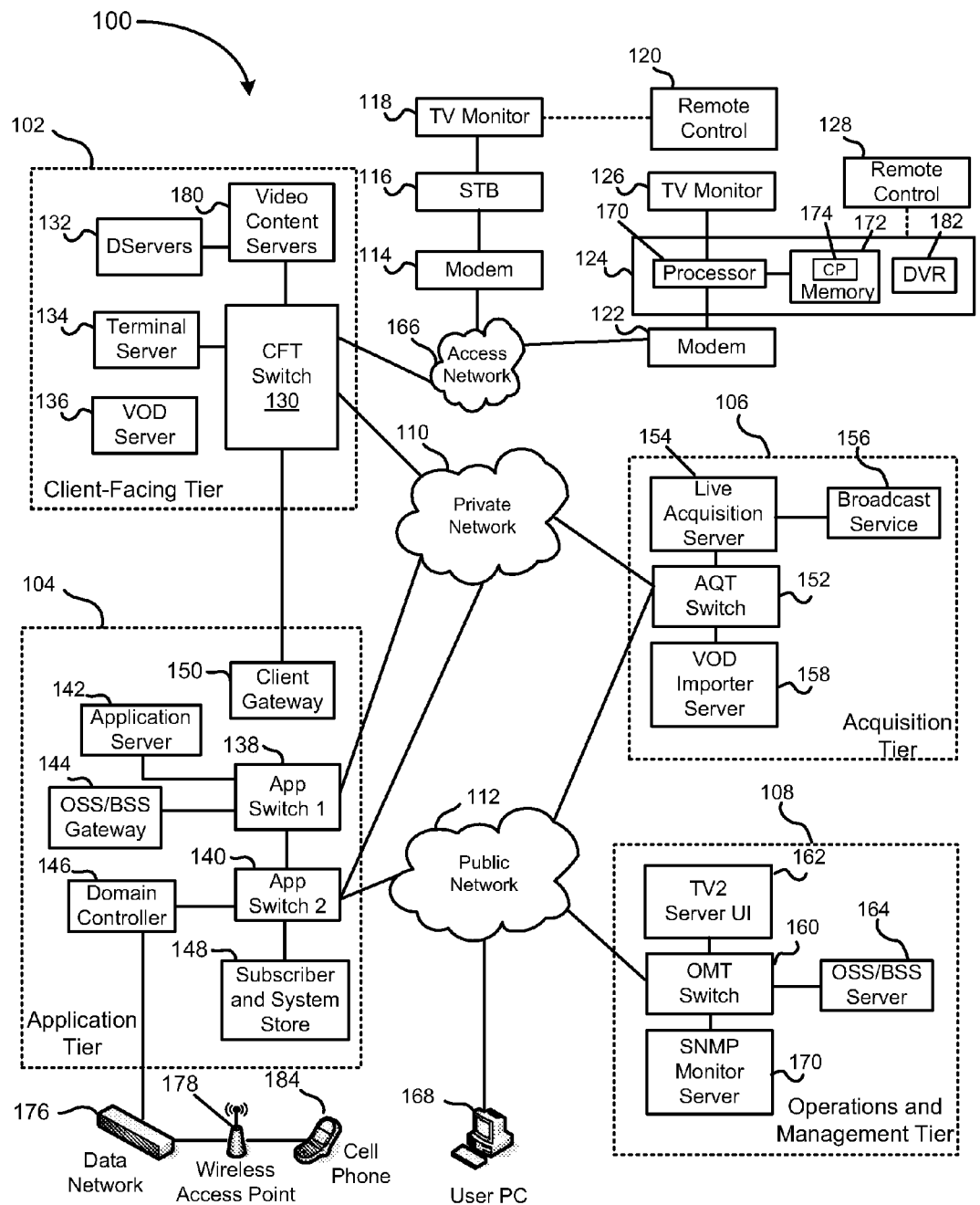
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-ondemand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
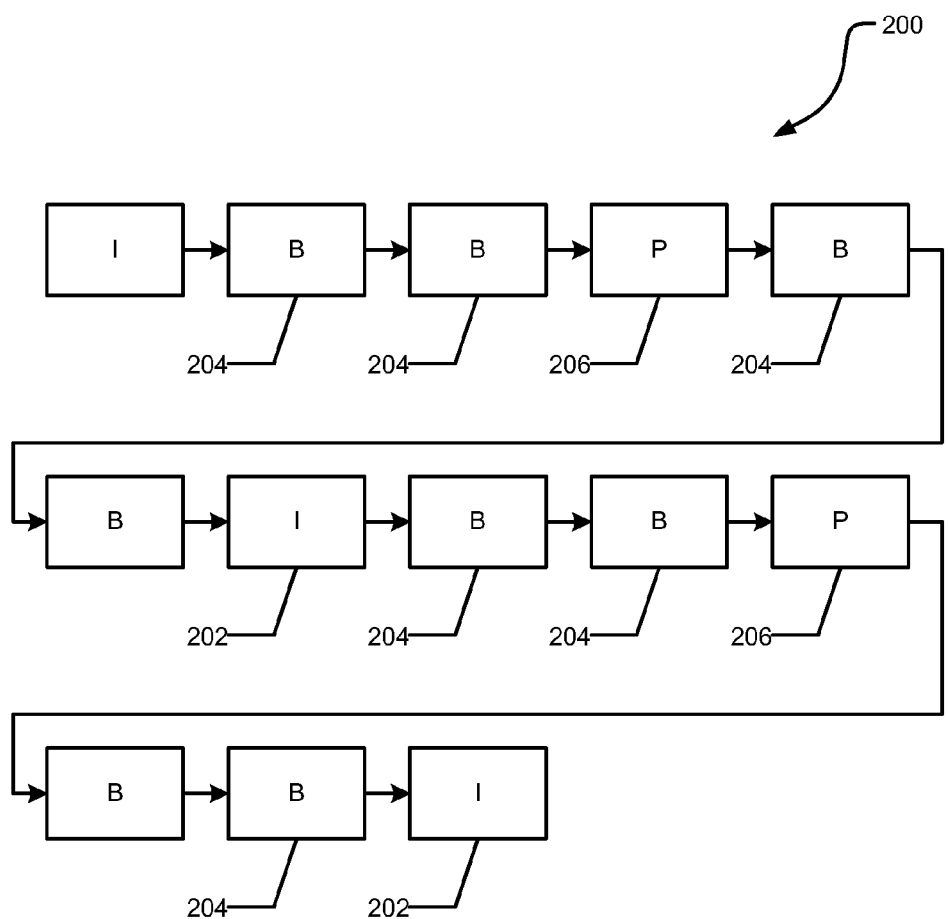
FIG. 2 is a block diagram of a digital video stream.

FIG. 2 shows a block diagram illustrating a digital video stream 200 that can include I-Frames 202, B-Frames 204, and P-Frames 206. Digital video stream 200 can be encrypted, such as by encrypting each frame of the digital video stream 200. Each I-Frame 202 can encode a single frame of video. Each I-Frame 202 also can be independent of the other frames of the digital video stream 200, and can be decoded without reference to the other frames of the digital video stream 200. In contrast, each B-Frame 204 and each P-Frame 206 can be encoded relative to reference frames. Reference frames can include I-Frames 202 and P-Frames 206. Each B-Frame 204 and each P-Frame 206 can describe a frame by describing the change or motion between the current frame and a reference frame and may require information from the reference frame during decoding. P-Frames 206 can be encoded relative to a closest previous reference frame, whereas B-Frames 204 can be encoded with reference to a closest previous reference frame, a closest next reference frame, or a combination thereof.

Figure 3:
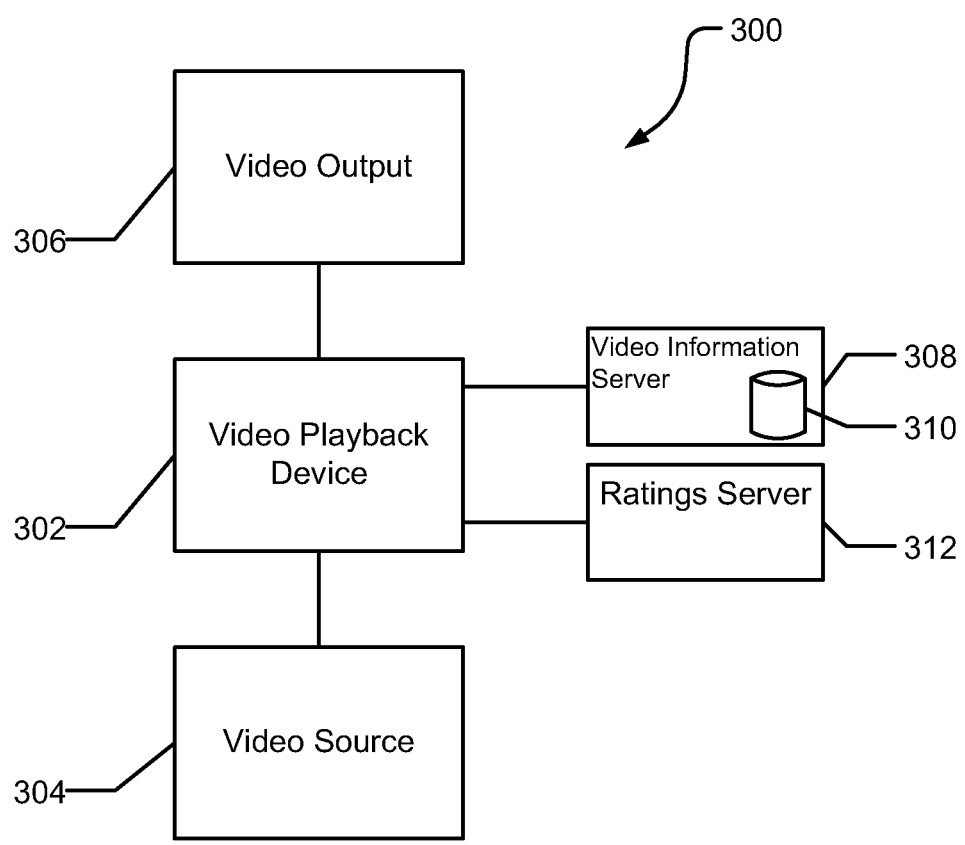
FIG. 3 is a block diagram illustrating a system for advanced parental control.

FIG. 3 shows a block diagram illustrating a system 300 for advanced parental control. The system 300 includes a video playback device 302, a video source 304, a video output 306, and a video information server 308. The video information server can include a video information database 310. The video playback device 302 may be an STB such as STB 124. Alternatively, the video playback device 302 may be a media player such as a DVD player, or a video display such as TV monitor 126. Additionally, the video playback device 302 may be implemented as software, hardware, or a combination thereof and incorporated into a computer such as PC 168. In another embodiment, the video playback device 302 may be incorporated into mobile device such as cellular telephone 184. The video playback device 302 receives a digital video stream from a video source 304. The video source 304 may include physical media such as a DVD, a streaming digital video such as an IPTV data stream, or a digital video recorder such as DVR 182. The video source 304 may provide either an encrypted digital video stream or an unencrypted digital video stream. The video playback device 302 can provide a video signal to the video output 306. The video output 306 may be an integrated display such as when the video playback device is incorporated into TV monitor 126. Alternatively, the video output may be an external device such as TV monitor 126 when the video playback device 302 is STB 124. Additionally, the video output 306 may be a video recording device such as DVR 182 or a DVD recorder. The video playback device 302 can determine the location of a scene within a digital video stream and compare the location to rating information to determine if the content should be blocked.

In an exemplary embodiment, the video playback device 302 can calculate a hash for an I-Frame within the digital video stream. When the digital video stream is encrypted, the hash may be calculated without decrypting the digital video stream for playback. The video playback device 302 may provide the hash of the I-Frame to the video information server 308. The video information server 308 can retrieve location information from the video information database 310. The location information may include timestamp representing the location of the I-Frame within the digital video stream. Additionally, the video information server 308 can retrieve rating information for the scene from the video information database 310. Alternatively, the video playback device 302 may retrieve the location and rating information from a local database that is periodically updated from the video information server 308.

In another embodiment, the video information server 308 may provide the location information to the video playback device 302. The video playback device 302 may retrieve rating information from a ratings server 312. The rating information may include the ratings and locations of scenes within the digital video stream. The video playback device 302 can compare the location information from the video information server 308 with the rating information from the ratings server 312 to determine if the scene should be blocked.

Features of the video playback device may be incorporated into various components of IPTV network 100. For example, the video playback device may be incorporated into STB 124 and have direct control over playback from DVR 182. In another example, the video playback device may be incorporated into TV monitor 126 preventing unauthorized content from being displayed and/or heard. In a further embodiment, the advanced parental control features can be incorporated into a network component, such as video content servers 180 or VOD server 136. Incorporating the advanced parental control features upstream of the customer premises can prevent unauthorized content from being sent to the customer premises and may reduce network traffic. In yet another embodiment, the advanced parental control features may be implemented in software, for example on a computer.

Figure 4:
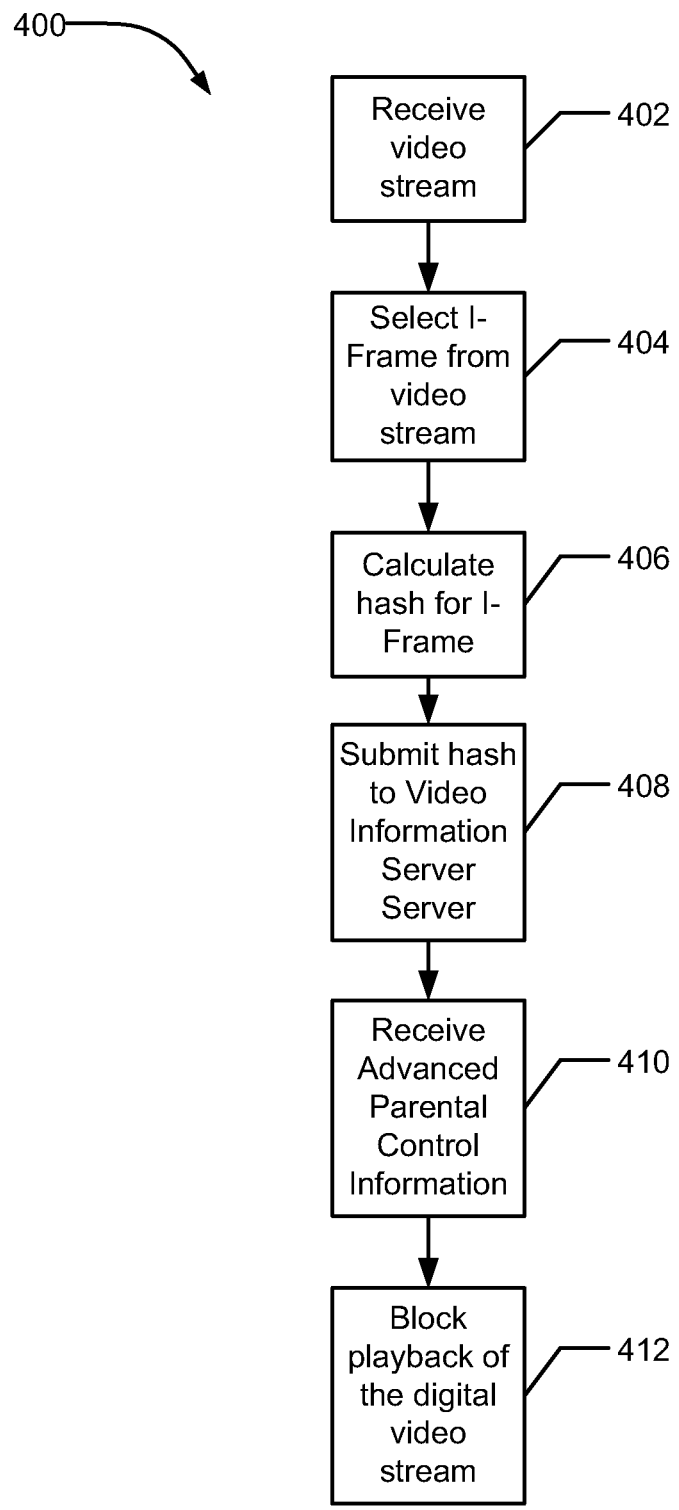
FIG. 4 is a flow diagram illustrating a method for advanced parental control.

FIG. 4 shows a flow diagram illustrating a method 400 for blocking playback of a scene. At 402, a video playback device can receive a digital video stream, such as digital video stream 200. The video playback device may be incorporated into an STB, such as STB 124, a TV monitor such as TV Monitor 126, or a computer such as PC 168. The digital video stream can be a prerecorded content such as a DVD, or content previously recorded by a DVR such as DVR 182. Alternatively, the digital video stream may be VOD content or may be a network broadcast. At 404, the video playback device can select an I-Frame from the digital video stream. The video playback device may select an I-Frame at regular intervals, such as at least about one I-Frame per sixty seconds of the digital video stream, preferably at least about one I-Frame per five to fifteen seconds. The video playback device can calculate a hash for the I-Frame, as illustrated at 406. Generally, hashes of similar data are significantly different. For example, a first I-Frame may be nearly identical to a second I-Frame, such as when only a small change has occurred in a scene. The hash of the first I-Frame can be significantly different from the hash of the second I-Frame, such that the first I-Frame can be distinguished from the second I-Frame based on the difference between the respective hashes. Generally, the algorithm used should generate a hash of sufficient length to have a high likelihood of providing a unique hash to each I-Frame of the digital video stream. In an exemplary embodiment, the algorithm can generate a hash of 128-bits. For example, the MD5, Blowfish, 3DES, and AES algorithms can generate a 128-bit hash. In another embodiment, the hash may be smaller, such as a 56-bit hash. In an alternate embodiment, the hash may be larger, such as 192 bits or 256 bits. At 408, the video playback device can submit the hash to a video information server.

The video information server may provide advanced parental control information to the video playback device, as illustrated at 410. In an exemplary embodiment, the advanced parental control information can include a rating and may also include a subrating. Various ratings systems are applicable to a variety of content, including movies, television programming, music, and video games. For example, the video information server may indicate that the I-Frame is part of a scene having an "R" rating due to language and violence. Additionally, the ratings server may provide a list of scenes that may have inappropriate content. The list may include location and rating information. The location information may include a list of I-Frames within the scene or timestamp information for the beginning and end of the scene. For example, the ratings server may indicate the presence of a first scene having an "R" rating for nudity and a second scene having a "PG-13" rating. The video information server may provide rating information for all the rated scenes of the content in the digital video stream or may provide a subset of rating information. The subset of rating information may include rating information for a subsequent portion of the digital video stream, such as not more than about five minutes and preferably not more than about thirty to about sixty seconds.

In an alternate embodiment, the video playback device may provide information about the advanced parental control settings to the video information server and the video information server may instruct the video playback device to block a segment of the digital video stream. For example, the video information server may instruct the video playback device to block the digital video stream for the next fifteen I-Frames or the video information server may instruct the video playback device to block the next five seconds of the digital video stream, based on the location and rating information.

In yet another embodiment, the video information server may provide location information for the I-Frame and the video playback device may retrieve ratings information from a ratings server such as ratings server 312. The ratings information may include location and rating information for scenes within the digital video stream. The video playback device may block the digital video stream based on comparing the location information provided by the video information server to the ratings information from the ratings server.

At 412, the video playback device can prevent playback of the video stream for the duration of an inappropriate scene. In an exemplary embodiment, the video playback device may blank the screen and mute the sound for the duration of the scene when the video playback device does not control the digital video stream, such as when the video playback device is part of a TV monitor or the digital video stream is part of a network broadcast. In an alternate embodiment, the video playback device may control playback and advance the digital video stream to a point just after the scene. For example, if the video playback device is incorporated into an STB having a DVR, the DVR can be instructed to skip ahead to the next scene. Additionally, an STB may instruct a separate device, such as a DVD player, to advance playback such as by sending a control signal to the DVD player. In yet another embodiment, the video playback device may pause playback and prompt an authorized user for instructions. In this way, an authorized user may temporarily override the parental control setting and view the scene.

Figure 5:
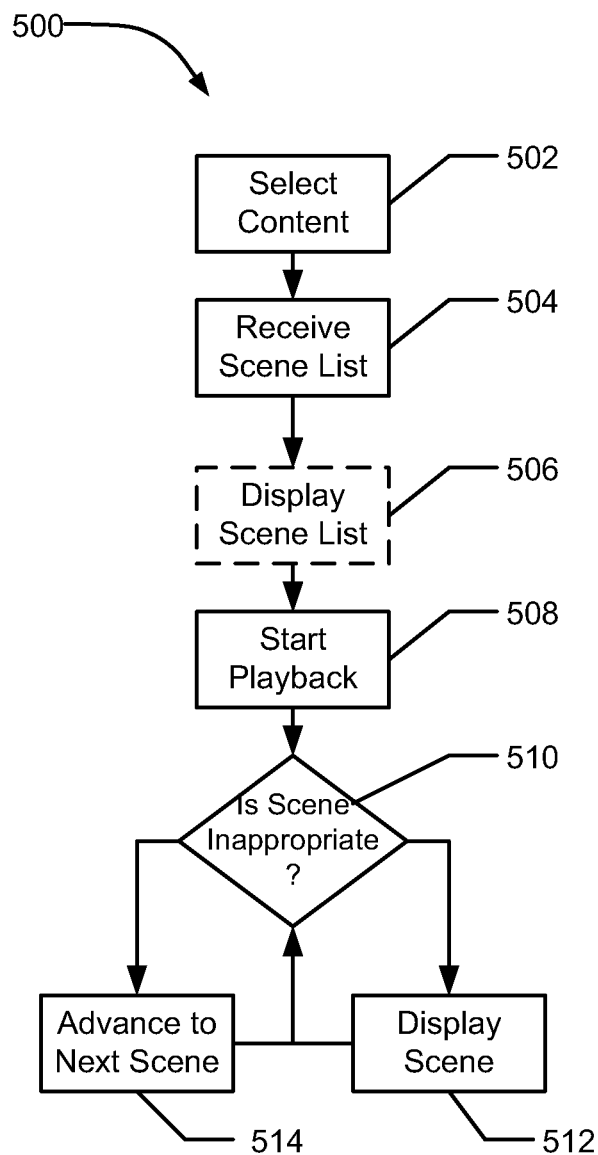
FIG. 5 is a flow diagram illustrating an alternate method for advanced parental control.

FIG. 5 shows a flow diagram illustrating a method 500 for blocking playback of inappropriate scenes. At 502, the subscriber selects content to be viewed. For example, the subscriber may use an on-screen guide to select content from a list of available VOD titles or programming stored on a DVR. The video playback device can receive a list of scenes that may contain inappropriate material, as illustrated at 504. The video playback device may obtain the list of scenes from a ratings server or the list of scenes may be stored in memory. At 506, the video playback device may optionally display the list of scenes. An authorized user may override the parental control settings for an individual scene. For example, a parent may choose to allow playback of a scene identified as inappropriate because of language, but choose to block playback of a scene identified as inappropriate because of violence. At 508, playback of the content may be started. As illustrate at 510, the video playback device may check to determine if a scene is inappropriate. For example, the video playback device may compare a current location within the content to the list of inappropriate scenes. When the scene is not on the list of inappropriate scenes, the video playback device may allow playback of the scenes, as illustrated at 512. Alternatively, when the scene is on the list of inappropriate scenes, the video playback device can advance to the next scene, as illustrated at 514. In an alternate embodiment, the video playback device may blank the screen and mute the sound to prevent playback rather than advancing playback to the next scene.

Figure 6:
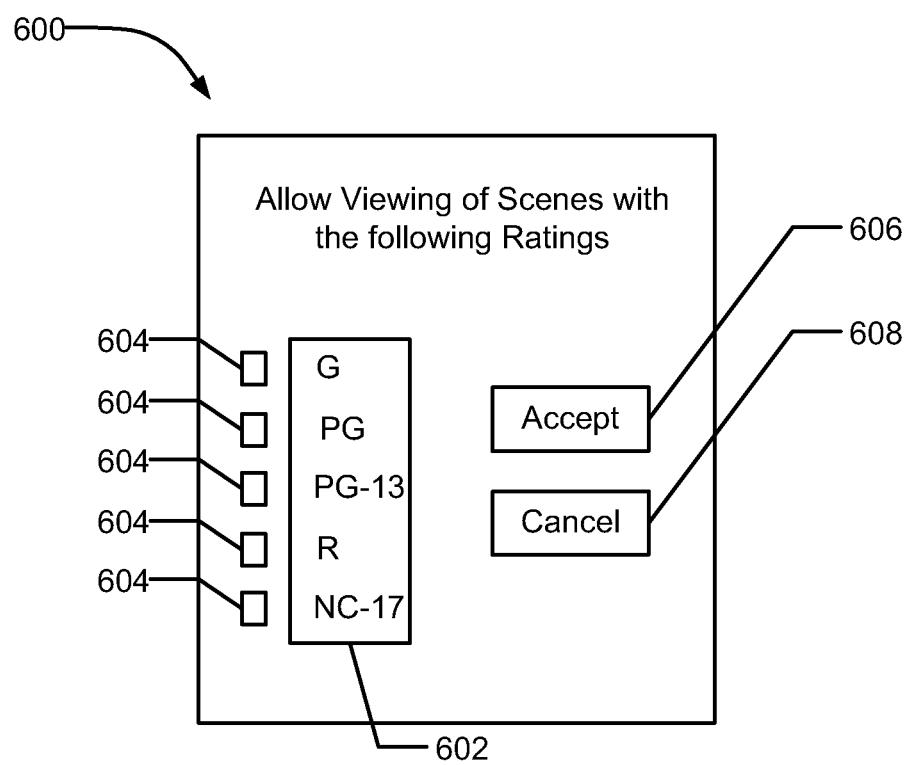
FIGS. 6 and 7 show exemplary interfaces for an advanced parental control system.
Figure 7:
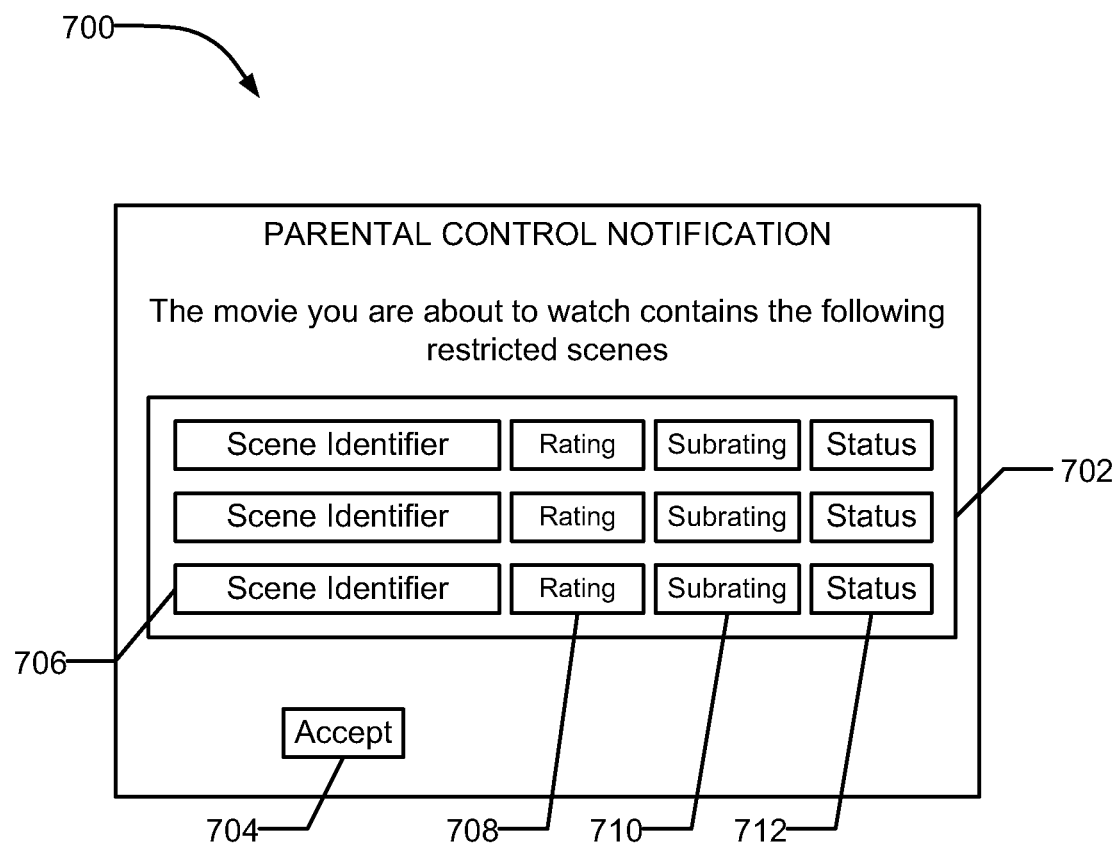

FIGS. 6 and 7 show exemplary interfaces for a video playback device, such as video playback device 302. FIG. 6 shows an exemplary interface 600 for identifying ratings for appropriate scenes. The interface 600 includes a list of ratings 602 and corresponding selection elements 604. The list of ratings can include various rating systems, such as movie ratings and television ratings. Similarly, ratings systems can be applied to music and video game content. Alternatively, the interface 600 can include multiple lists corresponding to various rating systems or rating services. Additionally, the list may include subratings. For example, a subscriber may select to allow PG-13 rated scene containing inappropriate language while not allowing PG-13 scenes containing nudity. Additionally, the interface 600 includes an accept button 606 and a cancel button 608. Selecting the accept button 606 causes changes to the settings to be saved, while selecting the cancel button 608 causes the settings to revert to a previously saved configuration.

FIG. 7 shows an exemplary interface 700 to provide notification of scenes within a movie that are classified as inappropriate. Interface 700 may allow an authorized user to temporarily suspend parental control settings for an individual scene. Interface 700 can include a list of scenes 702 and an accept button 704. Selecting the accept button 704 can cause the settings to be saved and playback to begin. The list of scenes 702 may include a scene entry including a scene identifier 706, such as a description of the location within the movie or a brief description of the scene. Additionally, the scene entry may include a rating 708 and a subrating 710. The rating 708 and subrating 710 identifies the reason the scene was identified as inappropriate. For example, a scene may be rated "R" for nudity and sexual content. Further, the scene entry may include a status 712. The status 712 may indicate that the scene will be skipped, or that the scene will be played. The authorized user may alter the status 712 of the scene to temporarily override the parental control settings for the scene.

Figure 8:
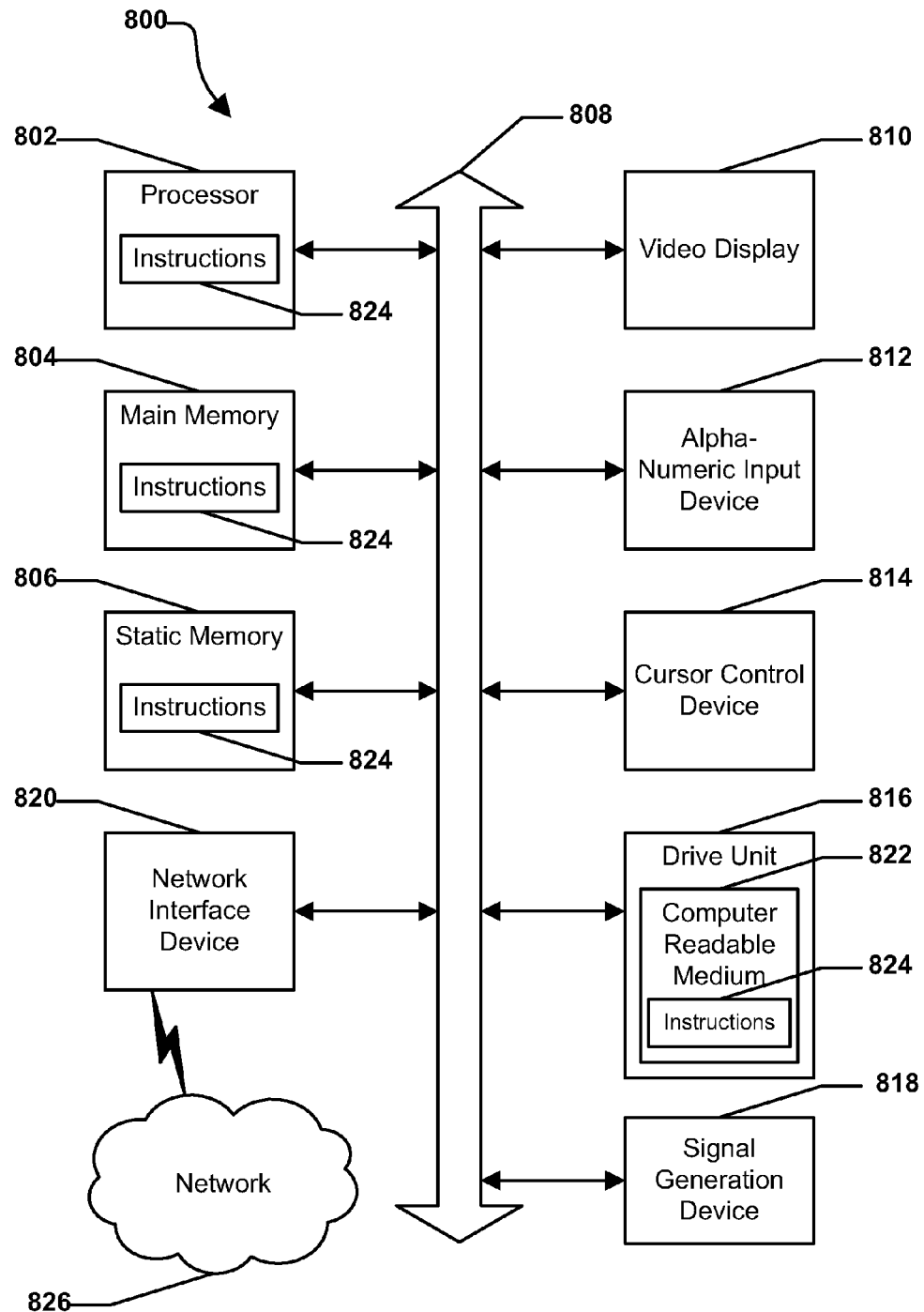
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set top box comprising:
a memory to store instructions; and
a processor coupled to the memory, wherein responsive to executing the instructions, the processor performs operations comprising:
receiving a digital video stream;
identifying an I-Frame within the digital video stream, wherein the identity of the I-Frame is determined by calculating a hash of the I-Frame by itself;
receiving location information for the I-Frame from a video information server;
receiving rating information for the I-Frame from a rating server; and
blocking playback of a portion of digital video stream based on comparing the location information with the rating information.

2. The set top box of claim 1 wherein the operations further comprise displaying the rating information.

3. The set top box of claim 1 wherein the operations further comprise providing an interface to identify rating information to be blocked.

4. The set top box of claim 1 wherein blocking playback of the portion of the digital video stream further comprises blanking a screen and muting an audio of a playback device.

5. The set top box of claim 1 wherein blocking playback of the portion of the digital video stream further comprises skipping to a second I-Frame.

6. A non-transitory computer readable medium comprising instructions which, when executed by a processor, cause the processor to perform operations comprising:
- identifying an I-Frame within a digital video stream by calculating a hash of the I-Frame alone;
- receiving location information for the I-Frame from a video information server:
- receiving rating information for the I-Frame from a ratings server; and
- blocking playback of a portion of the digital video stream in response to comparing the location rating information with the rating information.

7. The non-transitory computer readable medium of claim 6, wherein the operations further comprise displaying the rating information.

8. The non-transitory computer readable medium of claim 6, wherein the operations further comprise providing an interface to identify rating information to be blocked.

9. The non-transitory computer readable medium of claim 6, wherein the operations further comprise submitting the hash to the video information server.

10. The non-transitory computer readable medium of claim 6, wherein blocking playback of the portion of the digital video stream further comprises blanking a screen and muting an audio of a playback devise.

11. The non-transitory computer readable medium of claim 6, wherein blocking playback of the portion of the digital video stream further compromise skipping to a second I-Frame.

12. A method comprising:
- selecting an I-Frame of a scene from the digital video stream;
- determining an I-Frame identification for the I-Frame by calculating a hash of the I-Frame without calculating a hash of B-Frames and P-Frames of the scene;
- retrieving location for the I-Frame from a video information server;
- retrieving rating information for the scene from a rating server;
- providing the location information and the rating information to a device; and
- blocking the playback of the scene based on comparing the location with the rating information.

13. The method of claim 12 wherein the rating information comprises instructions to block playback of the scene.

14. The method of claim 12 wherein playback of the scene is blocked by blanking a screen and muting an audio of a playback device.

15. The method of claim 12 wherein playback of the scene is blocked by skipping to a second I-Frame.

16. A sever comprising:
- a database comprising an I-Frame identifier associated with a scene of video content;
- a memory to store instructions;
- a processor coupled to the memory, wherein responsive to executing the instructions, the processor performs operations comprising:
  - receiving a hash of an I-Frame from a client device, wherein a client device determines an I-Frame identifier for the I-Frame by calculating the hash of the I-Frame by itself; and
  - retrieving from the database location information for the scene in accordance with the I-Frame identifier;
  - retrieving rating information for the scene from a rating server; and
  - blocking the I-Frame based on comparing the location information with the rating Information.

17. The server of claim 16 wherein the operation further comprise utilizing a content filter to provide the rating information to a subscriber.

18. The server of claim 16 wherein the operation further comprise providing an interface to identify rating information to blocked.

19. The server of claim 16 wherein the I-Frame identifier is determined by calculating a hash of the I-Frame within a digital video stream.

20. The server of claim 16 wherein blocking the I-Frame comprises preventing transmission of the I-Frame to a device.

21. The system of claim 20 wherein the device is a set top box.

22. A set top box comprising:
- a memory to store instructions; and
- a processor coupled to the memory, wherein responsive to executing the instructions, the processor performs operations comprising:
  - receiving a digital video stream the digital video stream comprising; a plurality of scene;
  - determining a hash for an I-Frame by itself within the digital video stream;
  - sending the hash of the I-frame to a video information server;
  - receiving rating information for the plurality of scenes separate from the digital video stream, wherein the rating information comprises ratings of scenes and locations of scenes within the digital video stream;
  - receiving location information from the video information server wherein the location information comprises a timestamp representing the location of the I-Frame within the digital video stream;
  - comparing the rating information with the location information from the video information server; and
  - blocking playback of one of the scenes based on the rating information and the location information comparison.

23. The set top box of claim 22 wherein the operations further comprise displaying the rating information.

* * * * *